United States Patent [19]

Dowdy et al.

[11] Patent Number: 4,957,157
[45] Date of Patent: Sep. 18, 1990

[54] TWO-PHASE THERMAL CONTROL SYSTEM WITH A SPHERICAL WICKED RESERVOIR

[75] Inventors: Mack W. Dowdy, LaCanada, Calif.; Doanld J. Benko, Princeton, N.J.

[73] Assignee: General Electric Co., New York, N.Y.

[21] Appl. No.: 337,774

[22] Filed: Apr. 13, 1989

[51] Int. Cl.⁵ .............................................. F28D 15/02
[52] U.S. Cl. .................................. 165/104.27; 165/41; 165/104.26; 244/163
[58] Field of Search .............................. 165/104.27, 41; 244/163

[56] References Cited

U.S. PATENT DOCUMENTS 3,212,565 10/1965 Esleeck ........................... 165/104.27
3,923,188 12/1975 Lake, Jr. .
3,924,674 12/1975 Basiulis ............................ 165/104.26
4,240,405 12/1980 French ............................. 165/104.27
4,738,304 4/1988 Chalmers et al. ...................... 165/41

OTHER PUBLICATIONS

"Selection of a Surface-Tension Propellant Management System for the Viking 75 Orbiter" by Dowdy et al., published at pp. 549-558 of Journal of Spacecraft and Rockets, vol. 10, No. 9, Sep. 1973.
"Development and Qualification of the Propellant Management Systems for Viking 75 Orbiter" by Dowdy et al., published at pp. 133-140 of the Journal of Spacecraft and Rockets, vol. 14, No. 3, Mar. 1977.
"Design of a Two-Phase Capillary Pumped Flight Experiment", by Chalmers et al., published by SAE 18th Intersociety Conference on Environmental Systems, Jul. 11-13, 1988.

Primary Examiner—Albert W. Davis, Jr.

[57] ABSTRACT

A closed-loop two-phase thermal control loop includes an evaporator which receives subcooled coolant liquid from a condenser and heat from a source, and vaporizes the coolant to form coolant vapor. A condenser which is coupled to a thermal radiator accepts the coolant vapor and radiates thermally to space, thereby condensing the coolant vapor to liquid and subcooling the liquid. As the temperature of the environment surrounding the condenser radiator changes, the mass of vapor within the system tends to change, thereby causing undesirable pressure changes. A spherical wicked coolant reservoir is coupled to the liquid side of the closed thermal control loop. The reservoir is exposed foro thermal radiation and electrically heated, so that the temperature is thereby controlled in order to control vapor pressure within the reservoir. By controlling the reservoir vapor pressure, small pressure differentials are generated, which cause coolant liquid to be accepted or expelled while maintaining the closed loop pressure. The reservoir includes a wick for maintaining liquid coolant adjacent heat transfer areas, and also includes a standpipe supporting shaped vanes. The coolant adheres to the vanes and to the wick under zero-gravity conditions in a manner which allows at least partial simulation in an Earth gravity.

17 Claims, 15 Drawing Sheets

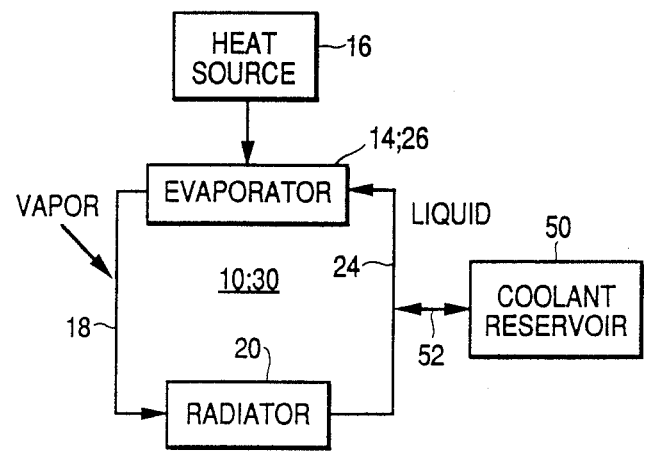
FIG. 3a
FIG. 3b
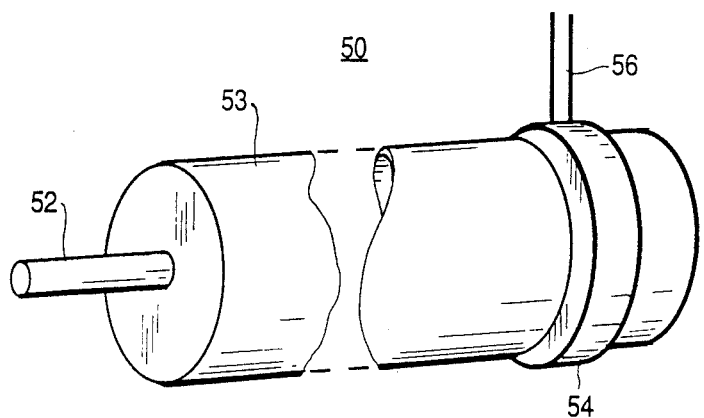

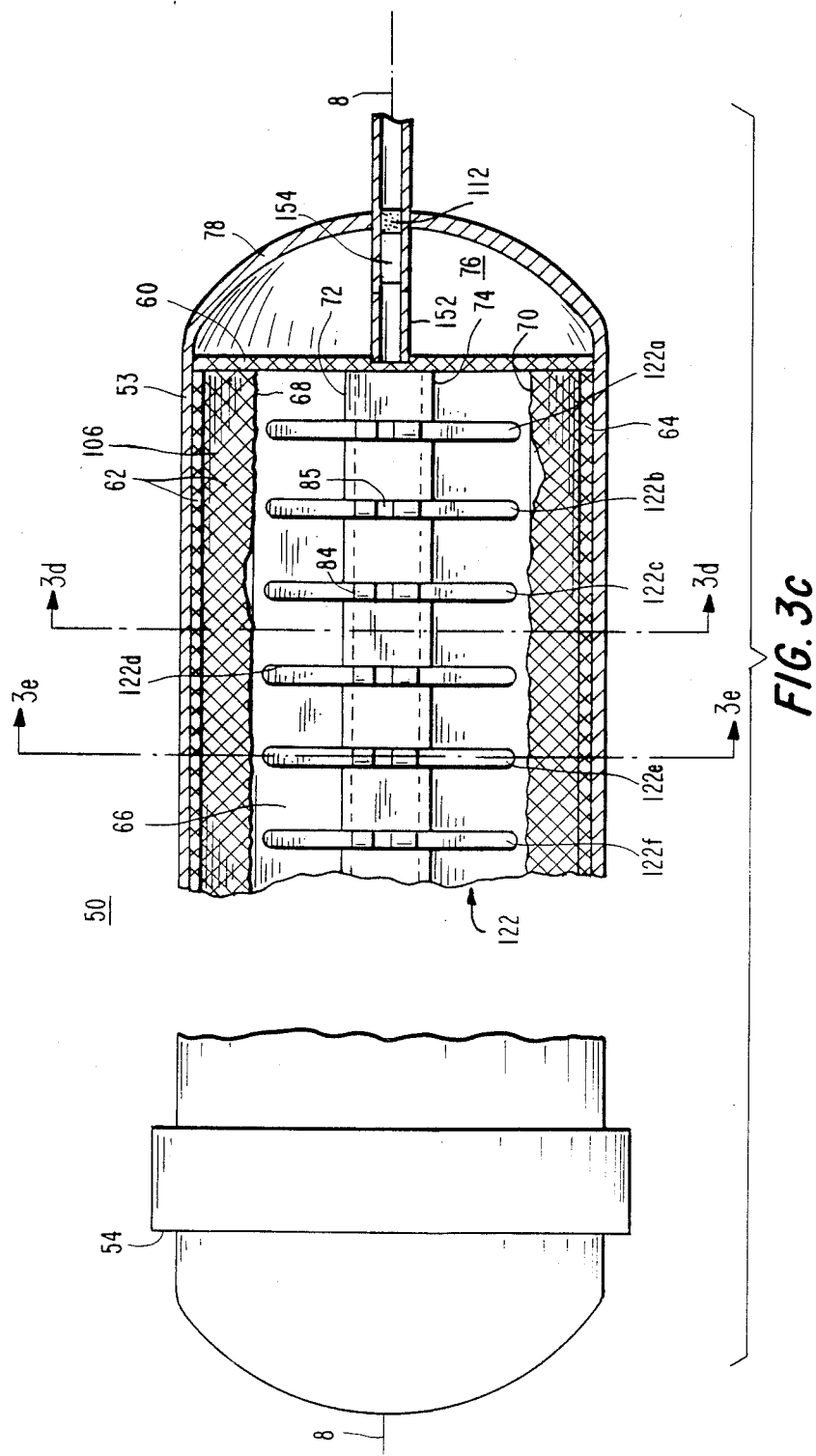

TANK ACCELERATION ←

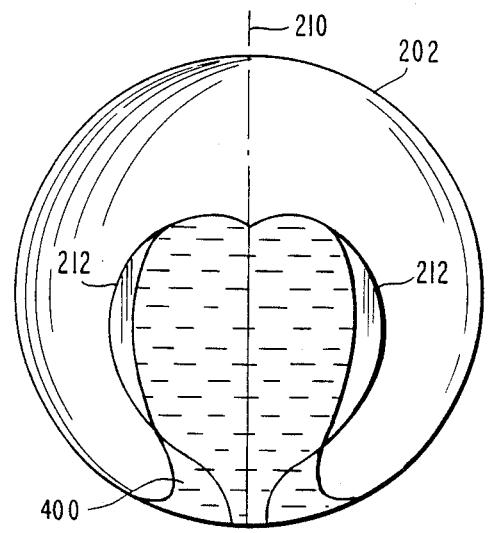
FIG.11a
FIG.11b
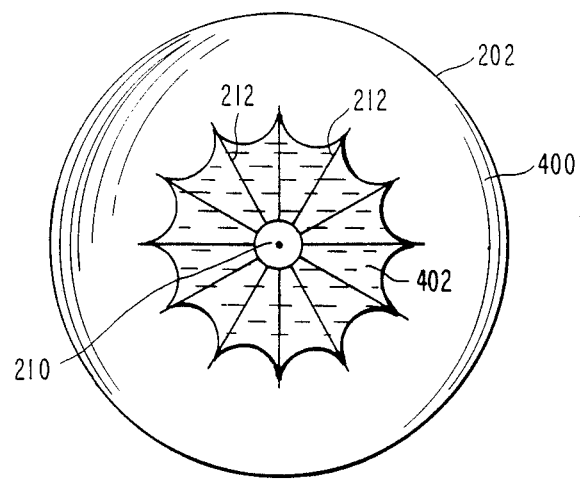

TWO-PHASE THERMAL CONTROL SYSTEM WITH A SPHERICAL WICKED RESERVOIR

BACKGROUND OF THE INVENTION

This invention relates to two-phase pumped thermal control systems which include an evaporator for evaporating coolant to form coolant vapor and a condenser for condensing the vapor back to liquid, and further including a reservoir for coolant inventory management.

Future spacecraft are expected to use higher power in their operating systems than heretofore, and will consequently require substantial heat rejection capability. Compliance with the heat transfer requirements of future spacecraft requires thermal control techniques with the capabilities of heat acquisition, transport, and rejection of large heat loads from high heat density sources, and for transporting the heat over long distances under varying operational conditions. A desirable thermal control system is that which uses two-phase coolant flow. Two-phase means that the heat transfer fluid or coolant is evaporated to form a vapor at the source of heat and condenses back to liquid form at the location where heat rejection takes place.

It is advantageous in designing heat exchangers and other portions of spacecraft thermal control subsystems, to select not only those which will work and are practical in a zero gravity or microgravity environment, but which in addition can be tested in an Earth gravity environment and work in that environment in approximately the same manner as in a microgravity environment. Copending patent applications Ser. Nos. 111,338 filed Oct. 22, 1987 and 219,115 filed July 15, 1988, both in the name of Fredley, describe pumped systems in which cold liquid is piped from a condenser to "cold" plates, which cool the source of heat, and at which the liquid coolant absorbs heat and evaporates. The vapor returns to a heat rejection device such as flat radiating panels which cool the vapor by electromagnetic radiation to space. Such electromagnetic radiation is also known as thermal radiation. It is desirable in some cases to avoid the use of a mechanical pump in order to circulate the liquid. The capillary pump system is advantageous because it requires no moving parts, relying only upon a capillary evaporator, but it has the disadvantage that it generates a pressure potential or head of only about one-half pound per square inch (½psi), and thus requires a system in which each of the components has a very low pressure drop.

The temperature at which a coolant fluid makes a transition from its vapor state to a liquid state depends upon the pressure to which the coolant is subjected. Thus, the designer of such a system must select a system pressure which, together with other system operating parameters, gives the desired heat transfer and rejection performance. Consequently, the system pressure must be maintained within certain preselected limits. In general, the pressure within a closed system which includes fluid in both the vapor and liquid states depends upon the temperature of the closed loop.

FIG. 1a illustrates in simplified form a closed loop thermal control system 10. In FIG. 1a, a mechanical pump 12 pumps coolant liquid through a pipe 24 from a radiator or condenser 20 to an evaporator 14. Normally, the liquid leaving radiator 20 is subcooled or cooled to a temperature below the temperature at which vaporization takes place at the system pressure. This avoids the possibility of the coolant flashing to a vapor state the moment it enters the evaporator 14. Evaporator 14 is thermally coupled to a heat source 16 and transfers the heat from source 16 to the coolant as it traverses the evaporator. At some point within the evaporator 14, the coolant absorbs sufficient heat so that its sensible heat increases to the vaporization temperature, and absorption of additional heat causes the coolant to vaporize. Coolant vapor exits from the evaporator 14 by way of a vapor pipe 18, which carries the heat-laden coolant vapor to a radiator 20. The radiator 20 ordinarily includes large panels to which the heat from the vapor is transferred and which generates black-body radiation illustrated by a photon symbol 22. The black-body radiation transfers the heat to outer space, thereby cooling the vapor until, at some point along the radiator, it condenses into liquid form. The liquid coolant leaves the radiator 20 by way of pipe 24 for return to the evaporator.

FIG. 1b illustrates a heat transfer loop 30 which is generally similar to transfer loop 10 of FIG. 1a. Elements of FIGURE 1b corresponding to those of FIG. 1a are designated by the same reference numerals. In FIG. 1b, however, there is no mechanical pump such as pump 12 of FIG. 1a. Instead, heat source 16 is coupled to a capillary evaporator 26 which generates a relatively small pressure head such as one-half pound per square inch. Such a system has reliability advantages because it lacks moving parts which might fail.

As mentioned in conjunction with FIG. 1a, the liquid coolant leaving the radiator 20 must be subcooled in order to prevent a situation in which liquid coolant flashes into vapor form as soon as it enters the evaporator 14 or 26. Such flashing may be disadvantageous, because it reduces the heat transfer capability of the evaporator. This is because a relatively large amount of heat is required to make a substantially constant-temperature transition between the liquid and vapor states, whereas it is difficult to transfer large amounts of heat to coolant vapor. Those skilled in the art know that the fluid pressure in a closed system such as those of FIG. 1 depends in part upon the environment and the load. For example, if radiator 20 is located in an environment in which it is "looking" or radiating into the cold environment of dark space, the system fluid pressure will tend to be lower than in the case in which it is in a warm environment. Also, an increase in the heat generated by the load, without other changes in the system environment, will tend to increase the system temperature and therefore the pressure.

FIG. 2a illustrates some details of a radiator 20 of FIG. 1 operating in a relatively cool environment. In FIG. 2a, vapor pipe 18 carries heat-laden coolant vapor to a manifold or plenum 36, which may be mounted on radiator 20. Manifold 36 distributes the vapor among a number, illustrated as five, pipes 38a, 38b, 38c, 38d and 38e, which are thermally coupled to radiator 20. A further manifold 40 collects condensed liquid from pipes 38a through 38e and transfers the liquid coolant to pipe 24. As illustrated in FIG. 2a, radiator 20 is in a relatively cold or dark environment, and radiates thermally to the environment as suggested by photon symbols 22. Since radiator 20 is relatively cold, heat is transferred away from the heat-laden vapor relatively quickly, and condensation takes place at a location transverse to pipes 38a through 38e illustrated by dot-dash line 42.

FIG. 2b is similar to FIG. 2a, and corresponding elements are designated by the same reference numerals. In FIG. 2b, however, the radiator 20 is in a relatively warm environment. Such a warm environment might be a location in which the sun, illustrated as 41, radiates onto the panel 20, as suggested by lines 44. Such radiation tends to raise the temperature of the radiator 20, and consequently the heat-laden vapor leaving manifold 36 must travel farther through pipes 38a through 38e before it condenses to liquid form. The location at which the vapor-to-liquid transition occurs is suggested by dot-dash line 46. By comparison of the conditions of FIG. 2b with that of FIG. 2a, it may be noted that placing the radiator panel 20 in a warm environment has resulted in a change in the ratio of liquid to vapor in pipes 38a through 38e. Portions of each pipe which in the case of FIG. 2a were filled with liquid are filled with vapor in the case of FIG. 2b. Put another way, a portion of the liquid in the pipes in the case of FIG. 2a has been turned to vapor in the situation of FIG. 2b. This tends to increase the fluid pressure within the closed system. The increase in fluid pressure may adversely affect the performance of the heat transfer loop, and may tend to rupture the components of the loop.

The problem of changes in pressure due to environmental conditions can be solved as illustrated in FIG. 3a. FIG. 3a is similar to FIG. 1b, and corresponding elements are designated by the same reference numerals. In FIG. 3a, a coolant reservoir illustrated as 50 is connected to liquid pipe 24 via another pipe 52. The coolant reservoir includes coolant in both liquid and vapor forms. The coolant reservoir accepts liquid coolant from the closed thermal control loop when system pressure tends to increase due to a hot environment of radiator 20 or to an increased heat load, and supplies liquid coolant to the thermal control loop when the pressure tends to drop due to a relatively cool environment surrounding the radiator 20 or a decreased heat load. As described below, this transfer of fluid is performed by controlling the temperature of the coolant in the reservoir. For example, the reservoir may be heated in order to raise the temperature of the vapor coolant therein, which creates a small pressure differential which forces liquid out of the reservoir into the heat transfer loop. Similarly, by turning off the heaters and allowing black-body radiation to cool the reservoir and coolant within, the pressure differential is reversed, thereby allowing liquid coolant from the heat transfer loop to be drawn back into the reservoir.

Generally speaking, coolant reservoir 50 must accommodate a volume of coolant sufficient to maintain substantially constant pressure within the closed thermal control loop 10; 30 under all environmental conditions, be capable of being emptied and refilled many times during a flight mission, control the flow of fluid by electrical heating and radiation cooling, prevent the generation of vapor pockets which might adversely affect operation, and prevent vapor bubbles from entering the outlet pipe. Such vapor bubble might deprive evaporator 26. Furthermore, the reservoir must function under all ordinary spacecraft environments and be capable of testing in a Earth gravity environment. While prevention of vapor pockets is desired, it should be understood that a vapor bubble will ordinarily exist within the reservoir.

FIG. 3b illustrates the physical configuration of one embodiment of a coolant reservoir 50 depicted in a FIG. 3a. As illustrated in FIGURE 3b, reservoir 50 includes a closed cylindrical wall or container 53, with an electrical heater illustrated as a circumferential band 54 located at one end of the cylindrical container. A pipe 52 connects the interior of container 53 with liquid pipe 24 of FIG. 3a. Wires illustrated as 56 connect heater 54 to a controlled source of power (not illustrated). FIG. 3c is an elevation view, partially cut away to reveal interior details, of reservoir 53 of FIG. 3b. Reservoir 53 is centered on an axis 8. FIG. 3d is a cross-section of the structure of FIG. 3c taken along section line d—d, orthogonal to axis 8.

Referring now to FIGS. 3c and 3d, a flat wick 60 extends transversely across the interior of container 53 between the cylindrical portion and curved end wall 78 of container 53 to thereby define a chamber 76. A pipe extension 152 continues pipe 52 and carries it to end within wick 60. Within cylindrical container 53, a metallic bracket illustrated as 66 joins the interior surface of container 53 along junction lines illustrated as 68 and 70. Bracket 66 together with the associated portion of container 53 defines a chamber 80 (on the left side in FIG. 3d) which is closed off at one end by flat wick 60. Bracket 66 is bent along two longitudinal lines 72 and 74 to define a flat central portion 82. An elongated member 84 is affixed to flat portion 82 of bracket 66 within chamber 80, and is shaped to define a longitudinal channel 85 which also terminates at wick 60. A further bracket 86 similar to bracket 66 is fastened within container 53. Bracket 86 also includes two bends to define a flat region 92 which is located opposite to flat region 82. Bracket 86 defines a further chamber 90 which is closed off or ends at wick 60. Chamber 90 is on the right side in FIGURE 3d. A further elongated member 94 affixed to the flat portion of bracket 86 defines a further longitudinal channel 95 which is closed off by wick 60. The interior wall of container 53 is lined with a circumferential wick, divided into a portion 62 in the upper half and a portion 64 in the lower half as illustrated in FIGS. 3c and 3d, and further portions 102 and 104 within chambers 80 and 90, respectively. Circumferential wick 102 within left side chamber 80 is turned near edges 68 and 70 and laps onto bracket 66, for reasons described in more detail below, at locations 113 and 114. A similar overlap occurs at 116 and 118 for wick 104 in right side chamber 90. A wick 106 covers that surface of bracket 66 which is remote from or faces away from chamber 80, and a similar wick 108 covers that surface of bracket 86 remote from chamber 90. For clarity in showing certain details described below, wick 106 is not shown in FIG. 3c. The surfaces of wicks 62 and 64 are represented by large cross-hatching. The facing flat portions 82 and 92 of brackets 66 and 86, respectively, may be near enough to each other so that wicks 106 and 108 are touching near axis 8. Brackets 66 and 86 together with the wall of container 53 define an upper chamber 81 and a lower chamber 83.

As so far generally described, liquid coolant can transfer between pipe 52 and interior chambers 76, 80, 81, 83 and 90 of reservoir 50, in both filling and emptying modes. To avoid redundancy, only an emptying mode is described in detail. Liquid coolant within chamber 76 is in contact with wick 60, and can leave chamber 76 by migration onto wick 60, thence to pipe extension 152 and through a wicked plug 112 to pipe 52. Wicked plug 112 aids in preventing the exit of any coolant vapor. Also, liquid can leave chamber 76 directly through an aperture 154 in pipe extension 152, which is occluded by wicked plug 112. Liquid in upper and lower chambers 81 and 83, and in side chambers 80 and 90, is in direct contact with wick 60 and can migrate therethrough to pipe extension 152 and thence to pipe 52. Liquid coolant in upper and lower chambers 81 and 83 is likely to be in contact with circumferential wicks 62 and 64, respectively, which in turn both communicate with wicks 106 and 108, which communicate with central longitudinal channels 85 and 95. Liquid within upper chamber 81 and lower chamber 83 can therefore migrate through wicks 62 and 64, and through wicks 106 and 108 to channels 85 and 95, and through the channels to end wick 60. From end wick 60, the liquid exits to pipe 52 as described above. The resistance to the flow of liquid is substantially greater within the wicks than in liquid channels such as 85 and 95. Consequently, upper chamber 81 tends to empty by lateral flow of liquid through its enveloping wicks 62, 106, and 108 to longitudinal channels 85 and 95, rather than by longitudinal flow through the enveloping wicks. Lower chamber 83 empties in the same fashion. As so far described, however, there is no communication between side chambers 80 and 90 and longitudinal channels 85 and 95. In the absence of such communication, side chambers 80 and 90 would have to empty by longitudinal flow through circumferential wick portions 102 and 104, which has relatively high resistance which might prevent fast emptying. Fast emptying in response to a small pressure differential is desirable for rapid response to changes in environmental conditions.

FIG. 3e is a cross-section of the structure of FIG. 3c taken along section lines e—e. Elements of FIG. 3e corresponding to those of FIGS. 3c and 3d are designated by the same reference numerals. Section line e—e of FIG. 3c is centered on a slot 122e formed in bracket 66. Slot 122e is one of a plurality of slots 122a, b, c, d, e, f . . . n, not all of which are visible in FIG. 3c. As mentioned above, wick 106 is not illustrated in FIG. 3C, so that slots 122a through 122f may be seen. As illustrated in FIG. 3c, portions of elongated member 84 can be seen through slots 122a through 122f, as can portions of longitudinal channel 85. Although not illustrated in FIG. 3c, circumferential wick 102 should be visible through the upper and lower portions of slots 122a through 122f. Each of slots 122a through 122f is dimensioned so that the surface tension forces of the coolant liquid in contact with the edges of the slot allow the coolant liquid to bridge across the slot, thereby forming a relatively low-resistance channel for the lateral flow of liquid. The channels defined by slots 122a through 122n bridge across longitudinal channels 85 and 95, thereby providing low-resistance channels for the flow of liquid which extend from the outer edges of the slots 122 to end wick 60, which closes off longitudinal channels 85 and 95. Consequently, upper and lower chambers 81 and 83, respectively, can transfer liquid at a relatively high rate to output wick 60, even at relatively low pressure differentials. In addition, since slots 122a through 122n pierce through bracket 66, they further provide lateral communication between side chambers 80 and 90 and the remainder of the system. In particular, bulk liquid can directly enter the low resistance channel defined by slot 122e from side chamber 80. In addition, the overlap portions 113 and 114 of wick 102 extend over the end of the slots, and in particular over the end of slot 122e, as illustrated in FIG. 3e, thereby providing communication between circumferential wick 102 and a low-resistance channel to the end wick 60.

As mentioned, it is very desirable that a thermal control system for operation in microgravity be capable of being tested in a gravity environment such as the Earth. Unlike the situation in the microgravity environment of space, the position or location of the liquid coolant is known to be at the bottom of the reservoir in a gravity environment. Depending upon the coolant, wicks having various mesh screens can raise the coolant liquid by different distances. For example, a 200-mesh aluminum screen can raise liquid ammonia ($NH_3$) by about 5 inches. The finest mesh screen which is conveniently usable is 400-mesh, which can raise the liquid somewhat higher. Since the greatest heat transfer occurs as a result of the transition between liquid and vapor states, testing for maximum heat transfer capacity requires that liquid be available at the heat transfer locations. Thus, the wick must be wetted by liquid at all heat transfer locations. In space, a large vapor bubble might be located at either the right or left ends as viewed in FIG. 3c. This could be simulated in an Earth-gravity environment by orienting the reservoir with exit pipe 52 at the top or at the bottom, respectively. However, it may not be possible to perform operating tests in an Earth gravity environment for all ullage or fill conditions and at all orientations of the reservoir. This is because the testable ullage condition is limited to that at which the wick can raise liquid coolant to the highest point of heat transfer, which for liquid ammonia and 200-mesh screen is about 5 inches. When the liquid drops more than 5 inches below the heat transfer region, at least a portion of the wick in the heat transfer region goes dry. In a dry-wick region, application of heat to the outer surface (or radiation of heat therefrom) of the surface no longer results in heat transfer of the same nature as that which would occur in a space environment. Consequently, tests of a reservoir such as that of FIG. 3 can be made at all conditions of the vapor space only when the cylinder is lying on its side, and then only if its diameter is less than the wicking height. In other orientations, i.e., pipe 52 up or down, the vapor space must have a height of less than the wicking height, and testing at other conditions cannot be relied upon. This testing problem is made more serious because the location of the vapor space may change shape and move about under the influence of acceleration of the spacecraft in response to orders to perform maneuvers.

An improved coolant reservoir is desired.

SUMMARY OF THE INVENTION

A reservoir adapted for use with a closed-loop pumped thermal control system for a spacecraft includes a spherical wall with an aperture for liquid intake/expulsion. The aperture is adapted to be coupled to the liquid path of a 2 phase thermal control system. The hemisphere centered on the aperture is the lower hemisphere when in an Earth gravity environment, and the other hemisphere is the upper hemisphere. At least a portion of the exterior wall in the upper hemisphere may be exposed to allow thermal radiation, and at least a portion is coupled to controllable heaters. The interior of the wall in the upper hemisphere is lined with a wire mesh wick in order to keep the wall wetted with liquid coolant. The aperture in the wall communicates with a standpipe projecting radially into the interior of the spherical reservoir. The reservoir further includes a plurality of fins or vanes which are supported by the standpipe. The fins are made of a material which is wetted by the coolant. In a particular embodiment of the invention, the interior of the standpipe is wicked, and the standpipe is fenestrated. Another aspect of the invention provides four elongated feed channels which extend about the interior surface of the reservoir following vertical meridian lines between hemispheres. These feed channels allow coolant entering the reservoir to be drawn to the wick surface in the upper hemisphere in order to keep the wick wetted with coolant. Another aspect of the invention thermally couples at least a portion of the upper hemisphere to a separate radiator. The separate radiator could act as a shield against damage from meteoroid/heated space debris impact and reduce the loss of heat from the upper hemisphere when heated.

DESCRIPTION OF THE DRAWINGS

FIGS. 1a and 1b are referred to jointly as FIG. 1;

FIGS. 3a, 3b, 3c, 3d, and 3e, referred to jointly as FIG. 3, illustrate, respectively, a loop of FIG. 1 with a pressure-regulating coolant reservoir, a cylindrical fluid reservoir, and longitudinal and first and second lateral cross-sections of the cylindrical reservoir;

FIGS. 11a and 11b, and 12a and 12b, illustrate conceptually the location of a vapor bubble in the reservoir of FIG. 4 under other conditions.

DESCRIPTION OF THE INVENTION

Figure 1A:
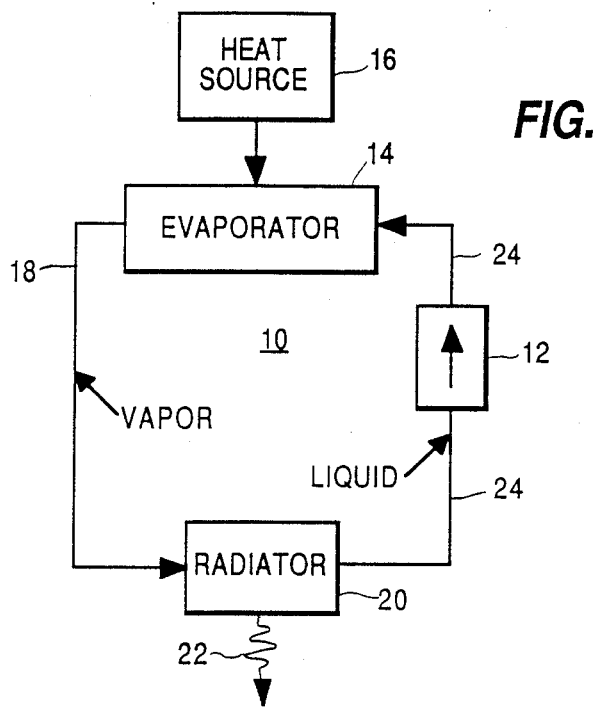
FIG. 1a is a simplified block diagram of a mechanically pumped thermal control system including a heat source, an evaporator and a heat rejection device.
Figure 1B:
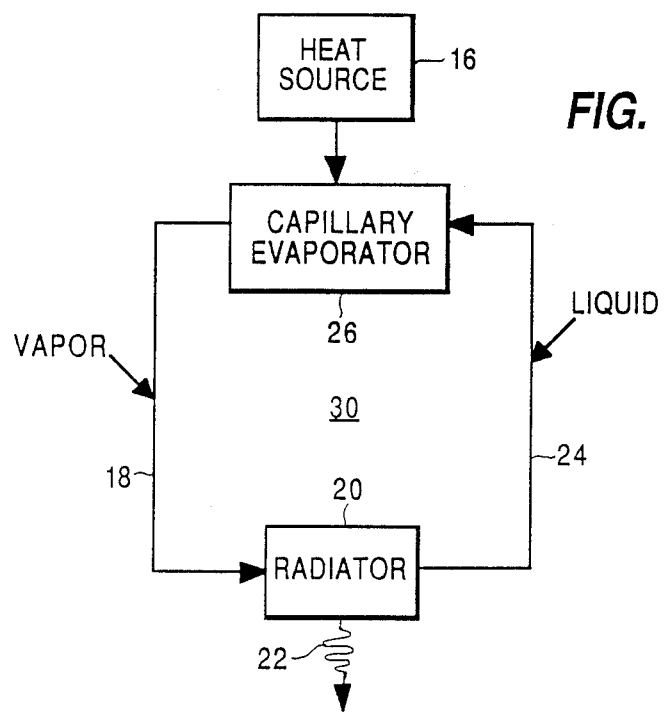
FIG. 1b is a simplified block diagram of a similar loop in which the pumping action is provided by a capillary evaporator.
Figure 2A:
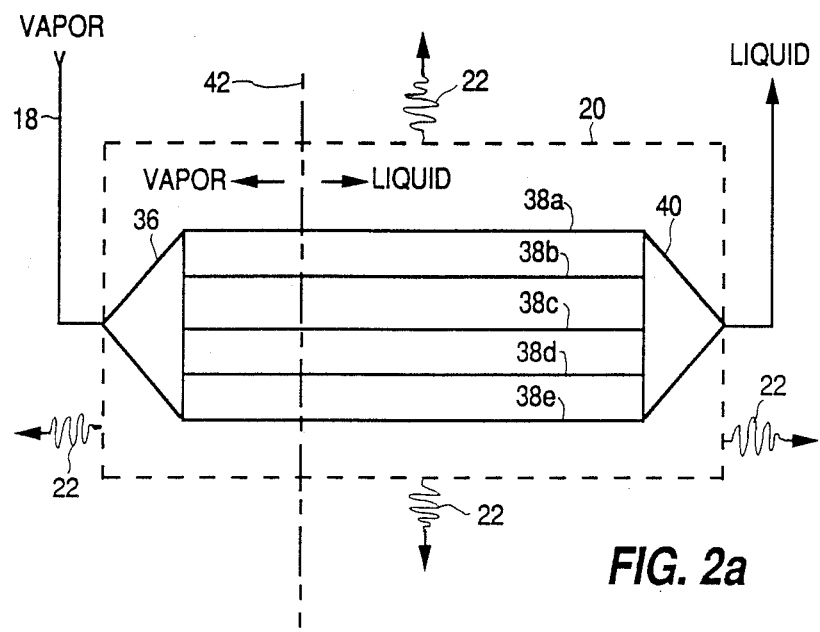
FIGS. 2a and 2b, referred to together as FIG. 2, illustrate the radiator of FIG. 1 under different temperature environments, showing change in relative location of the liquid/vapor interface which tends to change the system pressure.
Figure 2B:
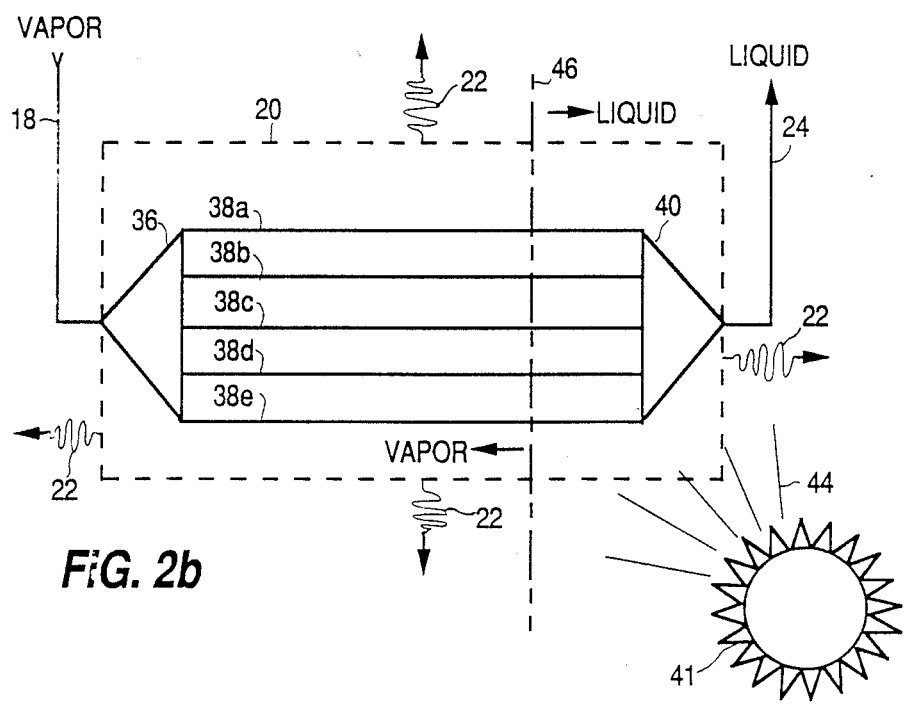
Figure 3D:
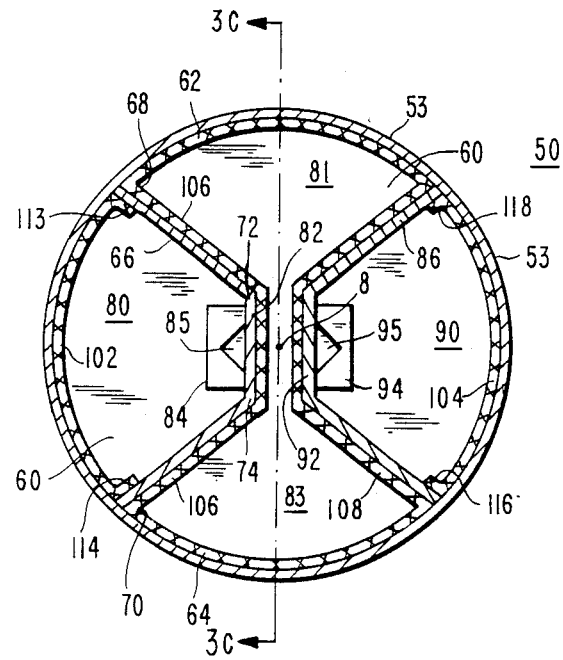
Figure 4:
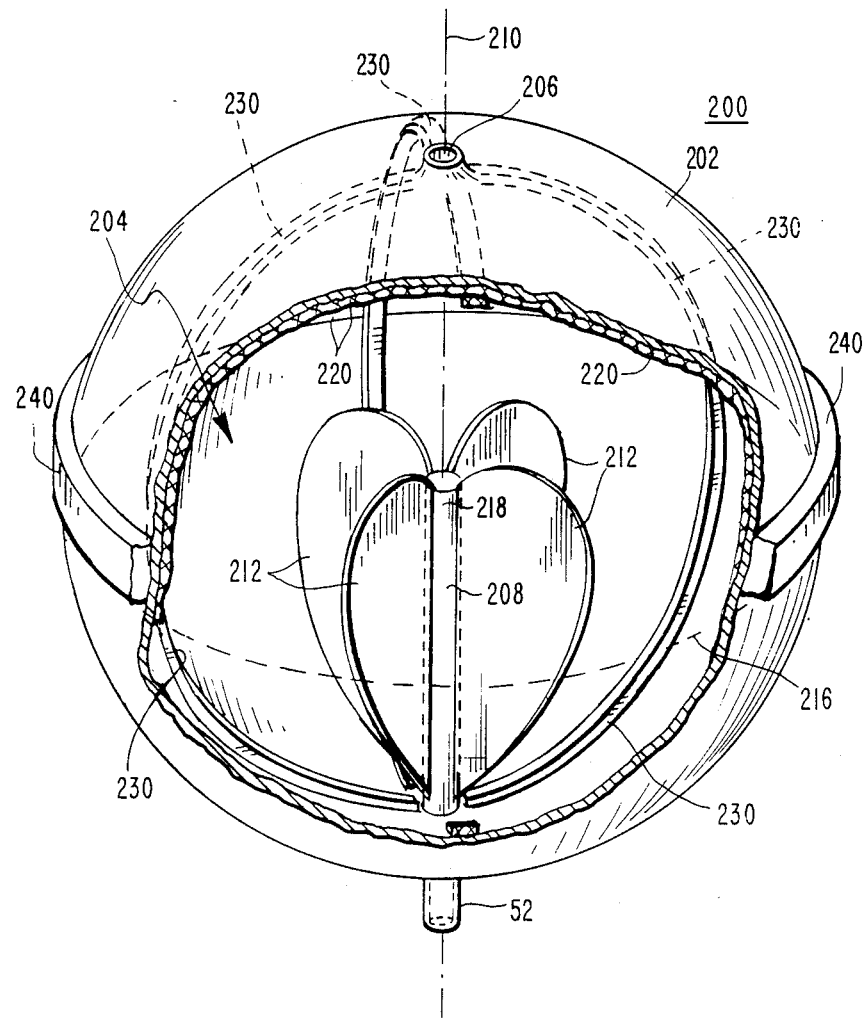
FIG. 4 is a simplified, perspective or isometric cutaway view of a spherical reservoir, including a standpipe and vanes, which may be used in conjunction with the loop of FIG. 3 in accordance with an aspect of the invention.

FIG. 4 illustrates in simplified perspective or isometric view a spherical reservoir 200 in accordance with the invention, partially cut-away in order to reveal the inner structure. In FIG. 4, the spherical reservoir 200 includes an outer wall 202 defining a spherical chamber 204 centered on a point 218, an auxiliary or filling orifice 206 which is plugged under ordinary conditions, and an exit orifice (not visible in FIG. 4) through which a fill pipe 52 communicates with interior chamber 204. The spherical reservoir 200 may be connected by pipe 52 to the closed thermal control loop of FIG. 3a in place of coolant reservoir 50 illustrated therein.

Pipe 52 communicates with a standpipe 208. Standpipe 208 extends away from wall 202 of reservoir 200 radially along an axis 210 which passes through the center of spherical reservoir 200. Standpipe 208 extends approximately to the center of the sphere, and physically supports a plurality of fins or vanes 212, which, as illustrated in FIG. 4, number five. One straight edge of each of the vanes 212 is affixed to standpipe 208 for support thereby, while the remainder of the periphery of each of the vanes defines a curve which is unconnected to any physical structure. The vanes 212 are equally spaced about standpipe 208. Standpipe 208 and the vanes are further illustrated in FIG. 7.

A dashed line 216 defines a plane orthogonal to axis 210 which passes through the center 218 of spherical reservoir 200. The position of dashed line 216 corresponds to the equatorial line on the spherical surface, and is so termed "equator". Equator 216 divides spherical reservoir 200 into an upper hemisphere, which is the nearer one as illustrated in FIG. 4, and a lower hemisphere which is nearer to and centered on pipe 52. A thin hemispherical wick 220 lies against the inside of wall 202 in the upper hemisphere of reservoir 200. The purpose of wick 220 is to maintain a layer of liquid coolant against the interior surface of wall 202 in the upper hemisphere of spherical reservoir 200 so that heat transfer may be accomplished between the wall and the layer of liquid coolant, which absorbs heat and vaporizes, to thereby allow control of the vapor pressure within reservoir 200.

Elongated, curved channels 230 extend at four equally spaced locations around the inner periphery of wall 202 between the points of intersection of axis 210 with wall 202. Channels 230 are formed mainly from wick material and are in contact with the interior of wall 202 in the lower hemisphere, and lie against the interior of hemispherical wick 220 in the upper hemisphere. As illustrated in more detail in FIG. 6, a minimum of three separate channels is required in order to allow the channels to lie flat against the interior walls and the wick. Channels 230 provide for the transfer of liquid from the lower hemisphere to the hemispherical wick in the upper hemisphere. Channels 230 terminate near the base of standpipe 208 in a manner described in more detail in conjunction with FIG. 8.

A plurality of electrical heaters illustrated as a circumferential band 240 girdles and is in intimate thermal contact with the outer surface of wall 202 of spherical reservoir 200 above Equator 216. As mentioned, such electrical heaters 240 are connected to a control system which monitors temperatures or pressures associated with the thermal control loop for controlling the temperature of the reservoir in such a manner as to cause liquid coolant to be added to or subtracted from the coolant charge circulating in the thermal control loop. When mounted in a spacecraft, reservoir 200 may be located in such a fashion that at least a portion of the exterior surface of wall 202 in the upper hemisphere is exposed to space or a portion of the surface is coupled to a radiator panel so that thermal radiation may occur. The heat lost by radiation may be made up by heat dissipated by electrical heaters 40 in order to maintain a constant temperature and therefore vapor pressure. Alternatively, if it is desired to allow the temperature to drop and thereby decrease the vapor pressure within reservoir 200 to allow fluid to enter from the thermal control loop, electrical heaters 240 are turned off or modulated to reduce the heat transferred to the hemisphere, whereby the heat lost by thermal radiation exceeds the heat gain from heaters, and the temperature therefore falls. Similarly, to raise the temperature of the sphere, increase the vapor pressure and expel liquid from the reservoir into the loop, the heaters provide more heat to the sphere than is lost through thermal radiation.

It should be emphasized that it is not absolutely necessary that the whole upper hemisphere be exposed for thermal radiation, or that the heaters be located only in a circumferential band. The portion of the surface exposed for radiation and that coupled to heaters may be selected based upon the morphology of the spacecraft, the power provided by the heaters and like considerations. However, wick 220 should lie against the interior of the wall 202 of spherical reservoir 200 at all locations on the wall at which heat transfer is desired.

Figure 5:
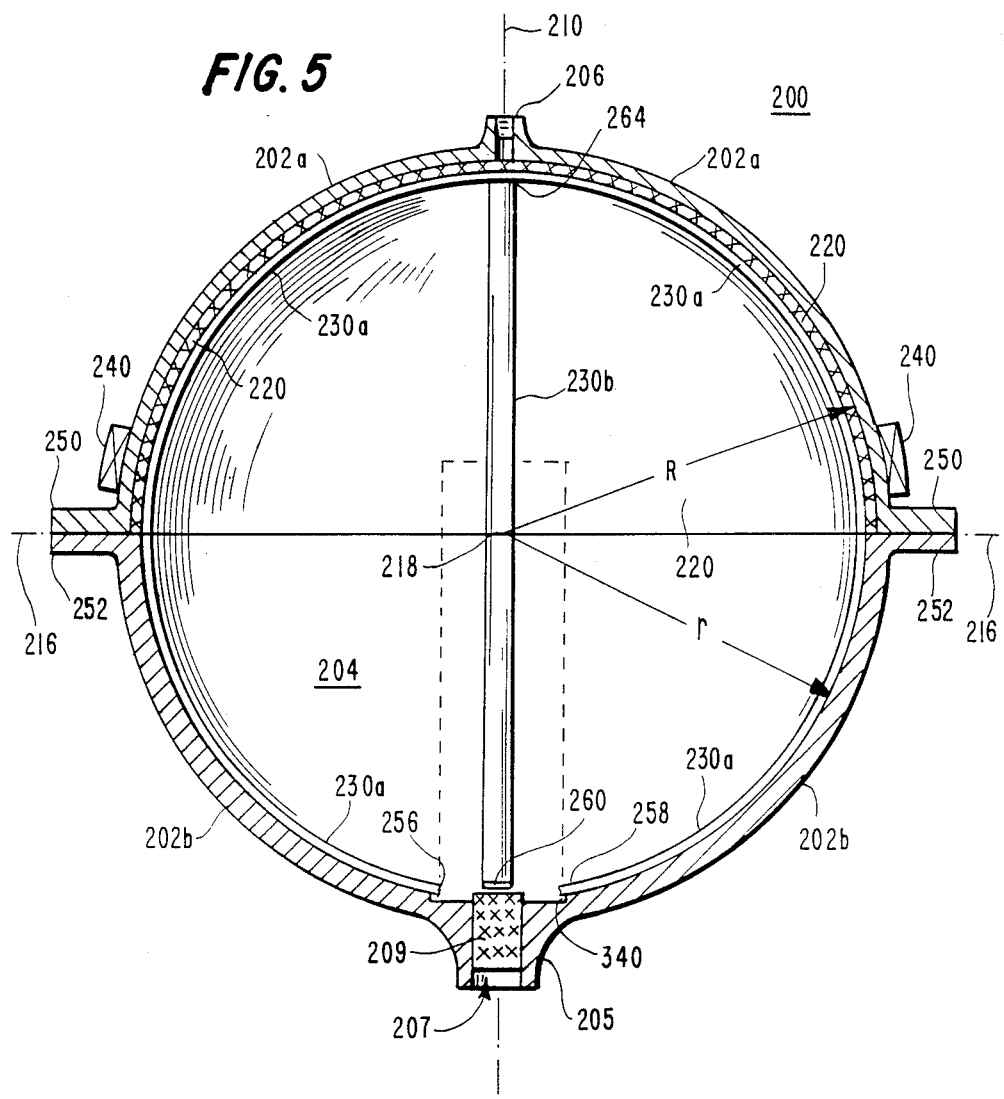
FIG. 5 is a simplified cross-sectional elevation view of the spherical reservoir of FIG. 4 taken along a central axis.

FIG. 5 is an elevation cross-section of spherical reservoir 200 of FIG. 4 taken along a plane parallel with axis 210 and passing through a channel 30. The illustration in FIG. 5 is simplified in that it does not show standpipe 208, so that the orientation of channels 230 may be seen more easily. FIG. 5 shows a receptacle 340 located near the bottom of the FIGURE, into which standpipe 208 is mounted. In FIG. 5, the outer wall of reservoir 200 is illustrated as being formed from an upper portion 202a and a lower portion 2b joined at equator 216 by mating flanges 250 and 2. The inner radius of lower wall 202b is illustrated as r, and the inner radius of upper hemispherical wall 2a is illustrated as R. R is greater than r by an amount equal to the thickness of hemispherical wick 220. Consequently, when hemispherical wick 220 is in place, there is a smooth transition between the inner surface of wall 202b at radius r to the inner surface of wick 220 at a radius equal to r.

FIG. 5 also illustrates as a circumferential band 230a one of the feed channels 230 which extends between the lower and upper hemispheres. As illustrated in FIG. 5, channel 230a extends from a terminating point 256 near the bottom of the reservoir all the way to and past the top of the reservoir, and back down the other side to terminate at a point 258. Channel 230a is therefore a continuous piece which lies against the interior of wall 202b and the lower hemisphere and which lies against the interior of wick 220 in the upper hemisphere. A second elongated channel 230b extends from a terminating point 260 near the bottom of the reservoir upward along the interior of wall 202b to Equator 216, and upward from Equator 216 along the interior surface of wick 220 to abut the edge (not visible in FIG. 5) of channel 230a. A similar piece of channel (not visible in FIG. 5 but described below in conjunction with FIG. 6) occupies the hemisphere of reservoir 200 opposite the hemisphere which is illustrated.

Figure 3E:
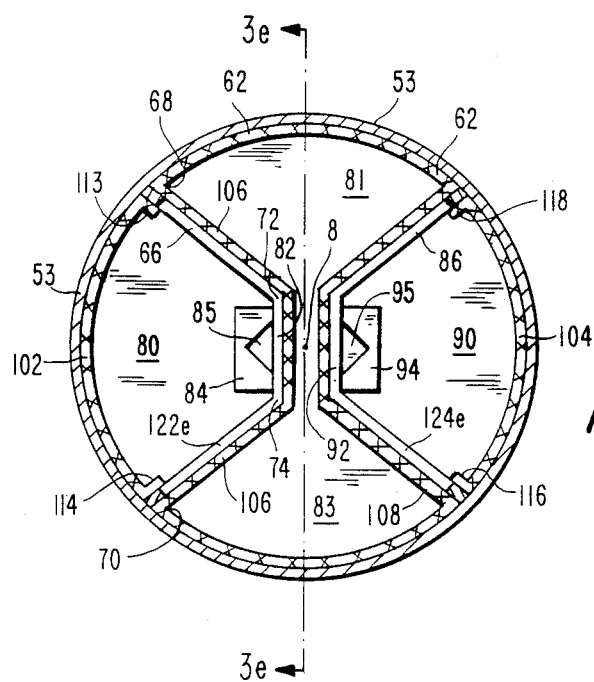

In FIG. 5, a plug 209 in the form of a wick is located in the exit orifice 207 to which standpipe 208 (not illustrated in FIG. 5) is coupled when it is mounted in receptacle 340. Plug 209 prevents bubbles of vapor from entering or leaving the reservoir. A flange 205 provides for connection to pipe 52 of FIGS. 3 and 4.

Figure 6A:
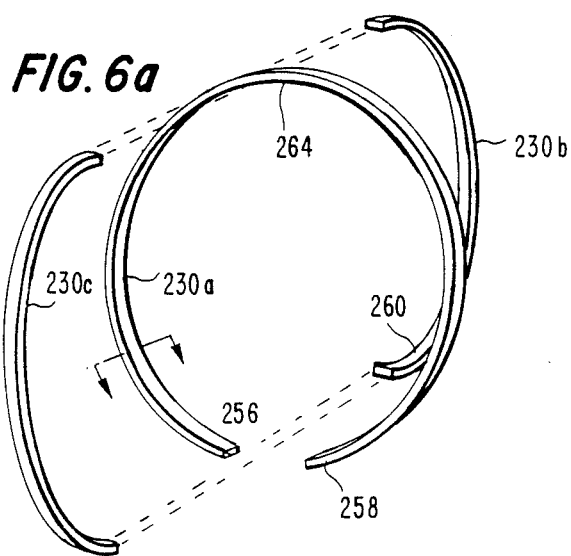
FIGS. 6a, 6b, and 6c, referred to jointly as FIG. 6, illustrate separately certain feed channel portions of the reservoir of FIG. 4, a cross-section of a channel, and a portion of a channel near the filling orifice, respectively.
Figure 6B:
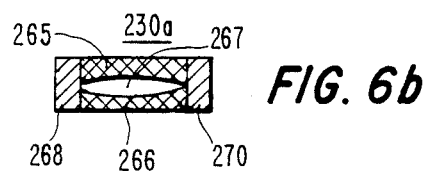
Figure 6C:
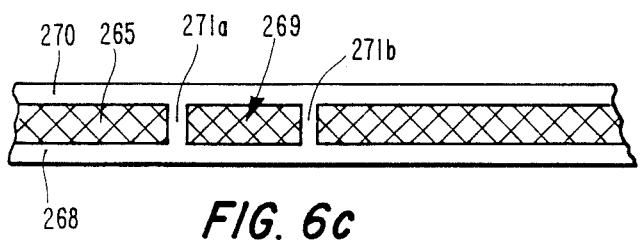

FIG. 6 illustrates elongated channels 230a and 230b and their mutual relationship, and also illustrates the third channel 230c. FIG. 6b illustrates a cross-section of channel 230a illustrating the wick portions 265 and 266 supported on each side by metal strips 268 and 270. A fluid channel 267 is defined between wick portions 265 and 266. Strips 268 and 270 provide rigidity for holding channel 230a in intimate contact with the interior wall of the surrounding structure. Cross-sections of elongated channel 230b and 230c are similar. At lower ends 258 and 260 of channels 230a and 230b, and at lower end 259 of channel 230c illustrated in FIG. 6a, their fluid channels 267 terminate adjacent to fenestrations of standpipe 208, as illustrated in more detail in conjunction with FIG. 8. FIG. 6c illustrates a view of the elongated channels near the auxiliary or filling orifice 206 of spherical reservoir 200. The wick portions of the channels are interrupted by solid metal strips 271a and 271b to form a window 269 to facilitate the initial loading of the channel with liquid coolant.

Figure 7A:
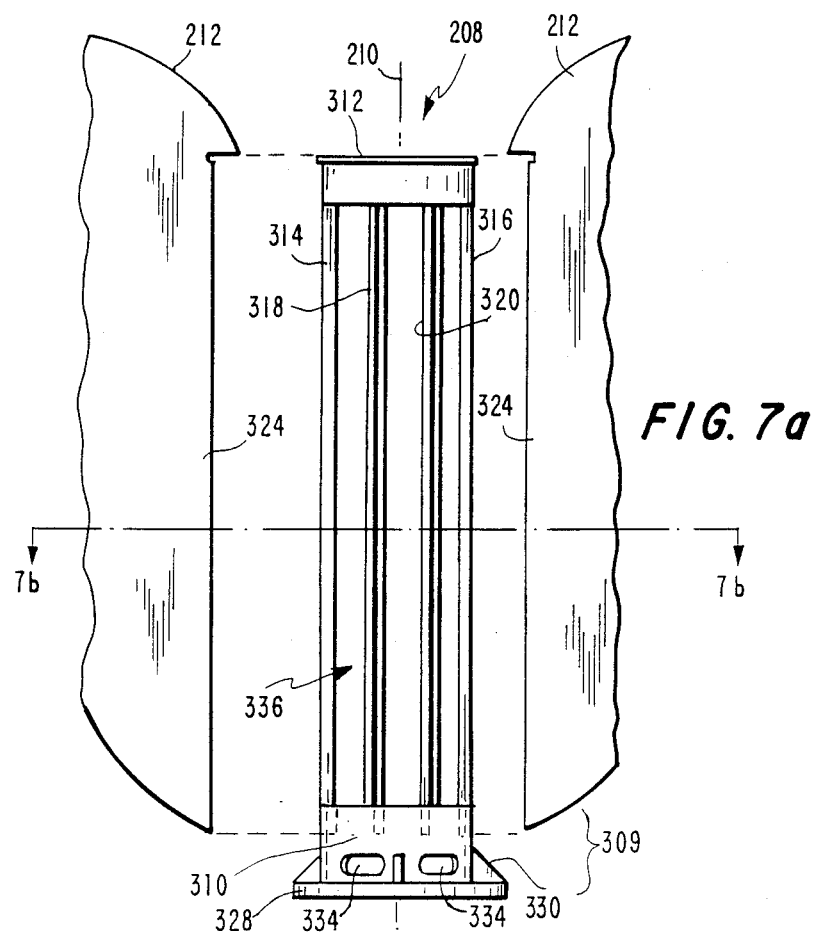
FIGS. 7a and 7b, referred to jointly as FIG. 7, illustrate separately the standpipe portion of the reservoir of FIG. 4 and a cross-section of the standpipe showing the vane attachment.
Figure 7B:
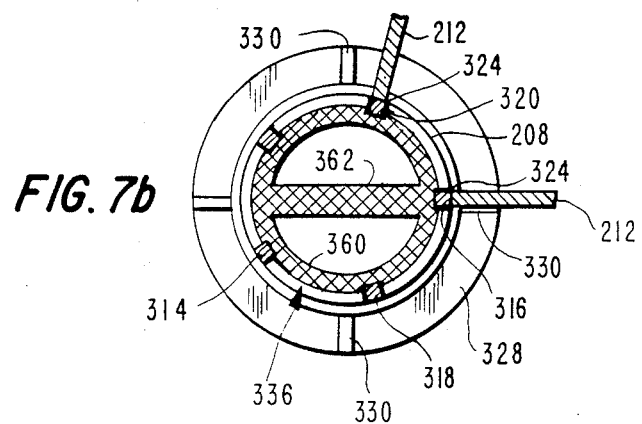

FIG. 7a is an elevation view of standpipe 208 and vanes 212, partially exploded. FIG. 7a is simplified in that it does not illustrate the interior wick. FIG. 7b is a cross-sectional view of the structure of FIG. 7a taken at section lines b—b, illustrating the wick and some, but not all, of vanes 212. In FIG. 7, a metal base portion 309 includes an annular section 310 in the form of a short pipe terminated at its lower end in a flange 328. Flange 328 is supported by a plurality of triangular gussets, one of which is denominated 330, which stiffen the region against forces which might act on the standpipe when the relatively large-area fins 212 are subject to sloshing of coolant during acceleration of the spacecraft. A plurality of apertures or fenestrations 334 are formed about annular section 310. Flange 328 is dimensioned to fit into receptacle 340 (illustrated at the bottom of reservoir 200 in FIG. 5). When so coupled, wicked plug 209 of FIG. 5 extends into annular section 310 far enough to close off fenestrations 334. These fenestrations provide for ingress of bulk liquid directly to wicked exit plug 209 (FIG. 5), and are located near the terminal regions (such as 256, 258 and 260) of channels 230a, 230b and 230c of FIG. 6, described in more detail below.

A metal cap 312 is spaced away from base portion 309 in FIG. 7a, and is held by a plurality of rectangular metal rods illustrated as 314, 316, 318, and 320. The number of such rods corresponds to the number of vanes, so for use with five vanes, there would be five rods; only four rods 314, 316, 318 and 320 are illustrated in FIG. 7a for clarity of illustration. Rods 314 through 320 are mechanically affixed to base 309 and to cap 312, as by welding, to thereby define what amounts to a skeletonized pipe defining large openings or fenestrations, one of which is designated 336, between mutually adjacent rods.

As illustrated in FIG. 7a, each of vanes 212 includes a straight edge 324. When assembled, as illustrated in FIG. 7, the straight edge 324 of each vane lies along and is affixed to one of rods 314 through 320. In an alternative embodiment of the invention, vane 212 and rod 324 are made as one piece and mechanically affixed to base 309 and to cap 312, as by welding. FIG. 7b also illustrates the wicks associated with standpipe 208. In FIG. 7b, a wick 360 seen in the form of an annulus lies within standpipe 208, supported by the inner edges of support rods 314 through 320. Annular wick 360 is elongated, and extends from base 309 to cap 312, and therefore completely occludes fenestrations 336. A further wick 362 in the form of an elongated strip lies within and extends diametrically across the inside of annular wick 360 from cap 312 to annular section 310 of base portion 309.

Figure 8A:
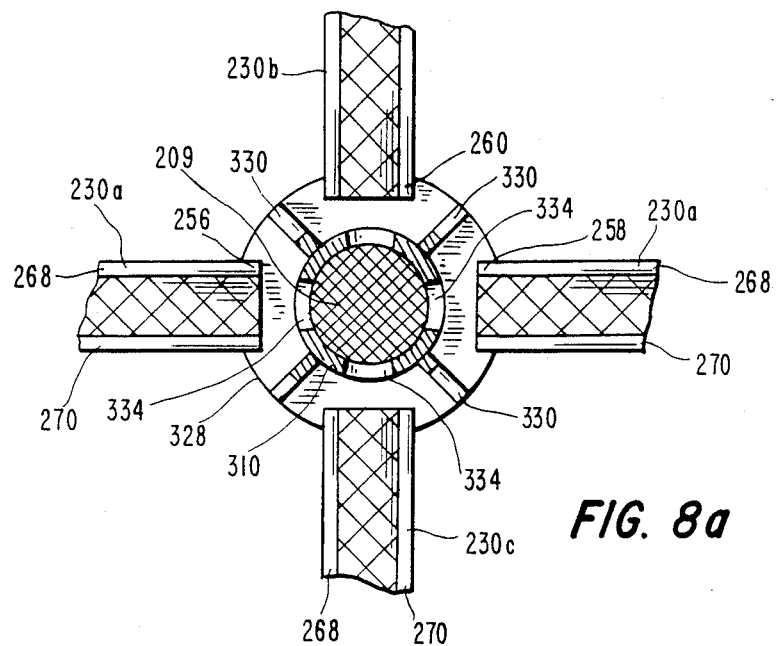
FIGS. 8a and 8b illustrate details of the conjunction of the fluid channels of FIG. 6 near the base of the standpipe of FIG. 7.
Figure 8B:
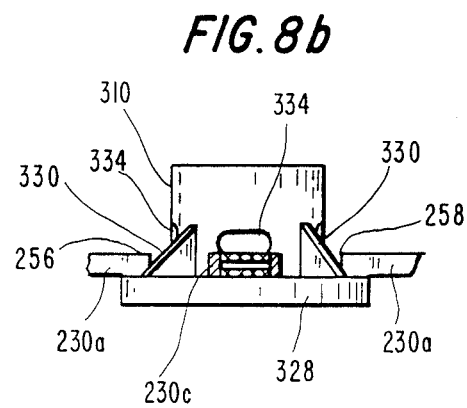

FIG. 8 illustrates details of the junction of the feed channels 230a, 230b and 230c (see also FIG. 6) with annular section 310 of standpipe 208 (see also FIG. 7). Elements of FIG. 8 corresponding to those of FIGS. 6 and 7 are designated by the same reference numbers. In FIG. 8, the upper portion of annular section 310 is cut away to reveal fenestrations 334. Ends 256 and 258 of feed channel 230 are closed off with wick material and are disposed near fenestrations 334, and the ends of metal strips 268 and 270 which support the sides of the feed channels are affixed to flange 328, as by welding. Similarly, feed channels 230a and 230b are closed off with wick material and the ends of the supporting metal strips are affixed to flange 328, as by welding.

Figure 9:
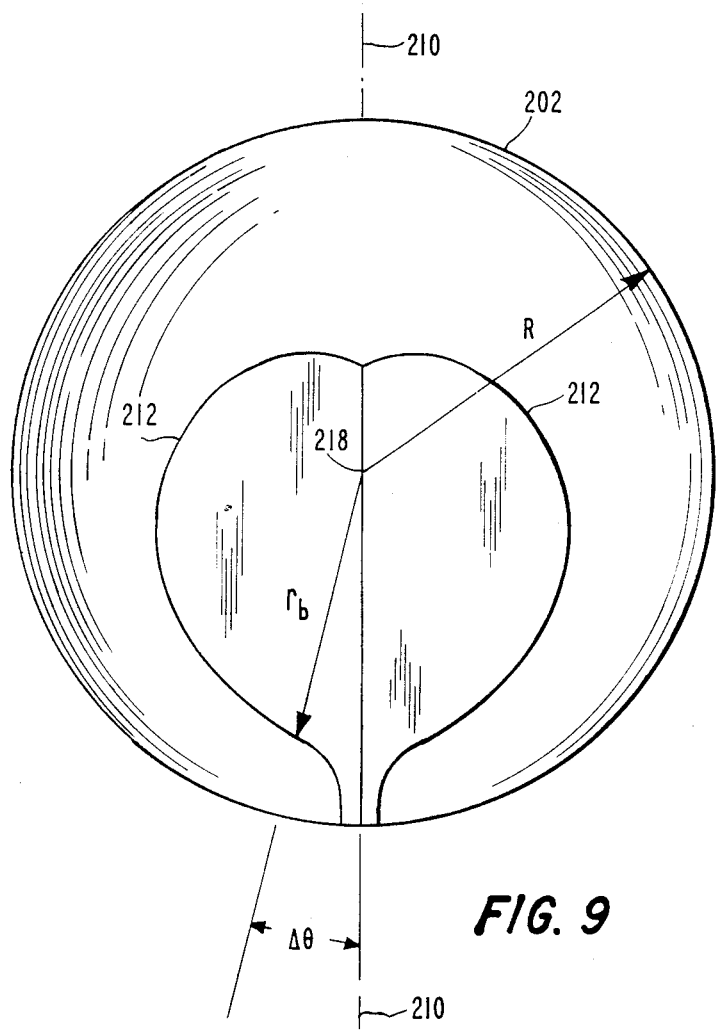
FIG. 9 illustrates in elevation view the general shape of the vanes of FIG. 4.

FIG. 9 is a simplified elevation view of vanes 212 of FIG. 4 within the reservoir walls 202, showing their general shape. In FIG. 9, vanes 212 are illustrated as being coplanar. The free edges of vanes 212 are defined by parameter, $r_b$, measured from center point 218. The parameter, $r_b$, is a function of the angle, $\Delta\theta$, measured from bottom of axis 210. The variation of $r_b$ with $\Delta\theta$ is selected to provide an increasing space between the vanes 212 and the inner wall 202 with increasing $\Delta\theta$.

Figure 10A:
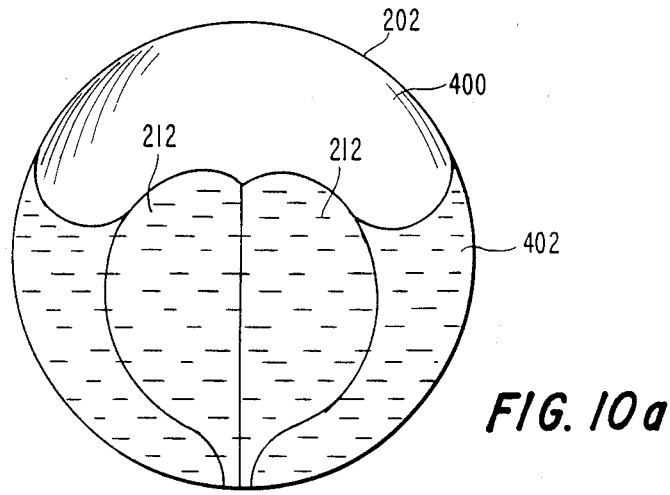
FIGS. 10a and 10b illustrate in a conceptual manner the location of a coolant vapor bubble about the standpipe and vanes of FIG. 7 under certain conditions.
Figure 10B:
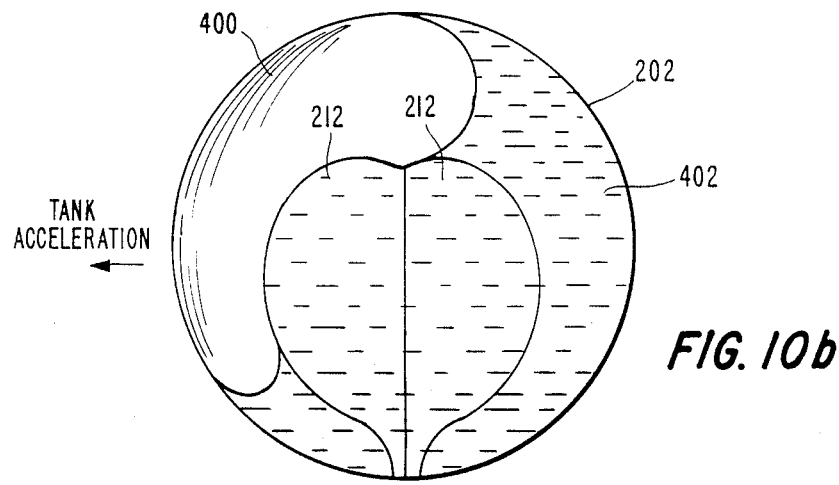

FIG. 10a illustrates in conceptual form the location of the ullage or vapor bubble 400 in a reservoir such as that of FIG. 4 with vanes 212 shaped as in FIG. 9, under zero-gravity small-bubble conditions. The liquid coolant is designated 402. FIG. 10b illustrates the same condition of ullage but with an acceleration of $10^{-4}$G (0.0001 times the force of Earth gravity), directed to the left. Note that the bubble tends to follow the periphery of the vanes. This results from surface tension forces, which try to minimize the surface area of the bubble. By adhering to the vane on one side and to the wick on the other, a portion of the bubble boundary is defined by the wick and the vane, thereby tending to minimize the surface of the bubble at the liquid-vapor interface.

FIG. 11a is similar to FIG. 10a, but for a larger vapor bubble. As can be seen, the liquid adheres principally to the standpipe and vanes. FIG. 11b is a plan view under the same conditions, illustrating the liquid distribution between a plurality of vanes, where the plurality is twelve.

Figure 12A:
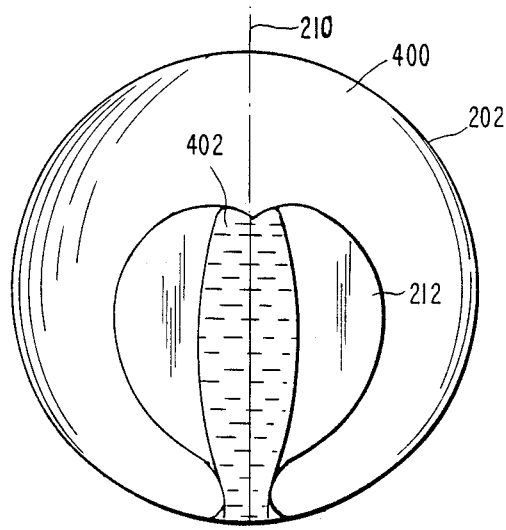
Figure 12B:
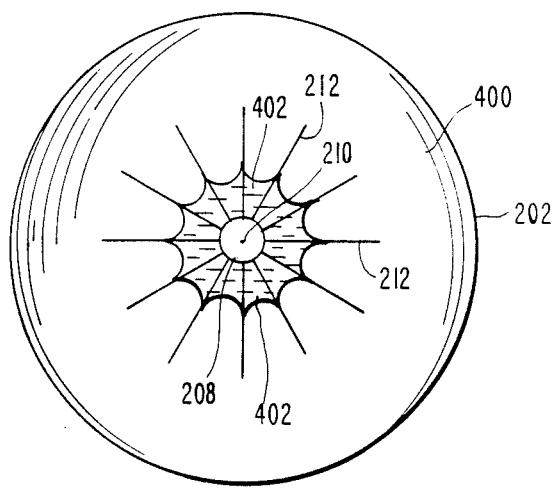

FIGS. 12a and 12b illustrate the system of FIG. 11 with almost all the liquid coolant 402 expelled, leaving a large vapor bubble 400.

Figure 13:
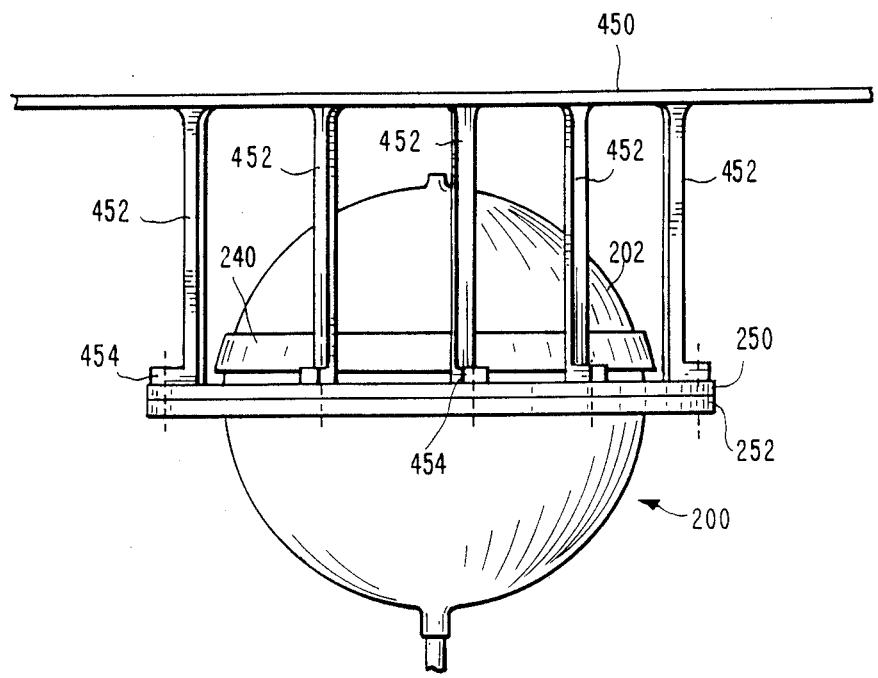
FIG. 13 illustrates in simplified cross-section the mounting of the reservoir of FIG. 4 to a portion of a spacecraft structure according to an aspect of the invention for controlling the amount of thermal radiation of the reservoir.

FIG. 13 is an exterior view of reservoir 200 of FIGS. 4 and 5 mounted to a portion of a spacecraft. In FIG. 4, a flat panel which is a portion of the spacecraft is mechanically and thermally coupled to a plurality of elongated thermally conductive mechanical support members illustrated as vertical members 452, each of which terminates in a lip or flange 454. Each flange 454 abuts and is fastened to the upper surface of flange 250, as by bolting through flanges 454, 250 and 252. This provides a thermal conduction path from flange 252 by way of members 452 to panel 450. More importantly, thermal radiation from the exterior surface of spherical wall 202 in the upper hemisphere is partially offset by thermal radiation from panel 450 back to reservoir 200. This tends to reduce the amount of overall heat loss, thereby reducing the power which must be supplied by heaters 240 to maintain a desired temperature and pressure. Further, panel 450 provides increased protection against penetration of reservoir 200 by micrometeorites.

It is clear from an examination of FIGS. 10 through 12 that the vapor bubble tends to remain near the top or upper hemisphere of reservoir 200, which simulates the condition in an Earth gravity environment, although the bubble surface is flat in a gravity environment rather than curved. Also, the bubble orientation under conditions of moderate acceleration in a zero-gravity environment (FIG. 10b) can be simulated in an Earth-gravity environment merely by tilting the reservoir to one side. The spherical shape of reservoir 200 maximizes the internal volume per unit weight of wall, which is highly desirable for space use. A further advantage of the spherical form is that for a given volume, the projected area integrated over all directions of space is minimum, which makes it less likely that the reservoir will be struck by an energetic micrometeoroid than for a corresponding rectangular or cylindrical reservoir.

Other embodiments of the invention will be apparent to those skilled in the art. For example, mechanically pumped systems may be used instead of capillary-pumped systems. A greater or lesser number of vanes or fins may be used. Coolants other than ammonia may be used depending upon the particular application. As described in conjunction with FIG. 7, standpipe 208 includes separate metal rod supports 314, 316 . . . extending between base 310 and cap 312, which are welded to vanes 212; the separate supports in effect become part of the associated vane, so in principle the edge of each vane can be welded directly to base 310 and to cap 312, thereby eliminating separate support rods such as 314 and 316. Cap 312 of FIG. 7 may be open or closed, as desired.

What is claimed is:

1. A capillary-pumped thermal control system for pumping fluid coolant around a closed loop, said system being usable in microgravity and also being capable of being tested in a gravity environment, comprising:
   an evaporator for absorbing heat and using the absorbed heat to vaporize said coolant to produce coolant vapor near a preselected pressure,
   at least one condenser coupled to said evaporator for receiving said coolant vapor, said condenser including a heat rejecting radiator for absorbing heat from said coolant vapor and for transferring said heat to the surroundings by thermal radiation to cause said coolant vapor to revert to liquid form, whereby when said condenser is exposed to a relatively warm environment, the ratio of the volume of liquid coolant to coolant vapor in said condenser is relatively small, and when said condenser is exposed to a relatively cold environment, said ratio is larger, which tends to change the amount of liquid in said closed loop and thereby change said preselected pressure;
   a liquid path for coupling said liquid coolant to said evaporator;
   a closed spherical reservoir coupled by a pipe to said liquid path of said closed loop, said spherical reservoir including a wall defining a first hemisphere which in a Earth gravity environment is the upper hemisphere and also defining a second hemisphere opposite said first hemisphere, at least a portion of the exterior of said wall of said upper hemisphere being thermally exposed to allow thermal radiation and at least a portion of said wall of said upper hemisphere being coupled to controllable heaters, the interior surface of said wall being in thermal contact with a thin wick at least in the vicinity of those regions of said wall which are exposed for thermal radiation and in those regions to which said heaters are coupled, said pipe opening into said wall of said reservoir at the center of said lower hemisphere, and communicating with a standpipe, which standpipe extends from said wall at said pipe opening in a radial inward direction about to the center of said spherical reservoir to thereby define a principal axis of said reservoir, said spherical reservoir further including a plurality of fins extending along and supported by said standpipe, said fins being made from a material which is wetted by said coolant, each of said fins extending away from said axis defined by said standpipe.

2. A system according to claim 1 wherein said coolant is ammonia.

3. A system according to claim 1 wherein said fins are essentially planar.

4. A system according to claim 3 wherein each of said fins defines a curved free edge which is not in contact with any solid structure.

5. A system according to claim 1 wherein at least a portion of each of said fins lies in that portion of the spherical volume of said reservoir which lies within said lower hemisphere.

6. A system according to claim 1 wherein said standpipe comprises:
a pipe-like support structure defining a bore and a plurality of fenestrations; and
a hollow, cylindrical wick defining an inner bore and having an outer diameter substantially equal to the inner diameter of said bore of said pipe-like support structure, said hollow, cylindrical wick extending through said bore of at least that portion of said pipe-like support structure defining said plurality of fenestrations.

7. A system according to claim 6 further comprising:
a wicked plug completely filling one of the bore of said pipe and said bore of said pipe-like support structure near the region in which said standpipe communicates with said pipe.

8. A system according to claim 7 wherein one end of said hollow, cylindrical wick is in contact with said wicked plug.

9. A system according to claim 6 further comprising a flat, elongated, wick defining first and second elongated sides and first and second ends, said flat, elongated, wick extending through said inner bore defined within said hollow, cylindrical wick, with said elongated sides in contact with the interior of said hollow, cylindrical wick.

10. A system according to claim 9 further comprising:
a wicked plug completely filling the bore of one of said pipe and said pipe-like support structure near the region in which said standpipe communicates with said pipe; and wherein
said first end of said flat, elongated, rectangular wick has said first end in contact with said wicked plug.

11. A system according to claim 1 further comprising at least one elongated feed wick located in part adjacent to said wall in said lower hemisphere and also extending at least to said thin wick for allowing the flow of coolant in said liquid state between said lower hemisphere to said thin wick.

12. A system according to claim 1 wherein said evaporator is a wicked evaporator incorporating pumping capacity without the need for a moving pump.

13. A system according to claim 1 wherein said fins are planar, and are equally spaced about said standpipe and each supported along one edge by said standpipe, and wherein said fins extend radially away from said standpipe.

14. A system according to claim 1 wherein said wall of said spherical reservoir is mechanically and thermally coupled to a panel which extends orthogonal to said principal axis of said spherical reservoir at a location spaced away from said first hemisphere.

15. A system according to claim 6 further comprising at least one elongated feed channel defined between first and second elongated wicks, said feed channel defining first and second elongated flat sides and first and second ends, said feed channel extending about said interior of said spherical reservoir with said first elongated flat side of said elongated feed channel substantially in contact with said thin wick in those regions of said interior over which said thin wick extends and substantially in contact with said wall of said spherical reservoir in those regions of said interior over which said thin wick does not extend.

16. A system according to claim 15 wherein said first and second ends of said elongated feed channel are located contiguous with the juncture of said standpipe and said wall of said spherical reservoir.

17. A closed spherical reservoir adapted to be coupled by a pipe to a liquid coolant path of a thermal control loop, said spherical reservoir including a wall defining a first hemisphere which in a Earth gravity environment is the upper hemisphere and also defining a second hemisphere opposite said first hemisphere, at least a portion of the exterior of said wall of said upper hemisphere being thermally exposed to allow thermal radiation and at least a portion of said wall of said upper hemisphere being coupled to controllable heaters, the interior surface of said wall being in thermal contact with a thin wick at least in the vicinity of those regions of said wall which are exposed for thermal radiation and in those regions to which said heaters are coupled, said pipe opening into said wall of said reservoir at the center of said lower hemisphere, and communicating with a standpipe, which standpipe extends from said wall at said pipe opening in a radial inward direction about to the center of said spherical reservoir to thereby define a principal axis of said reservoir, said spherical reservoir further including a plurality of fins extending along and supported by said standpipe, said fins being made from a material which is wetted by said coolant, each of said fins extending away from said axis defined by said standpipe.

* * * * *

UNITED STATES PATENT AND TRADEMARK OFFICE
CERTIFICATE OF CORRECTION

PATENT NO. : 4,957,157

DATED : September 18, 1990

INVENTOR(S) : Mack Wayne Dowdy et al.

It is certified that error appears in the above-identified patent and that said Letters Patent is hereby corrected as shown below:

Cover page, second inventor's first name is misspelled. "Doanld J. Benko" should be --Donald J. Benko--.

Cover page, in the Abstract, line 13, "foro" should be --for--.

Signed and Sealed this

Twenty-sixth Day of May, 1992

Attest:

DOUGLAS B. COMER

*Attesting Officer*   *Acting Commissioner of Patents and Trademarks*